United States Patent
Kawamae et al.

(10) Patent No.: US 7,751,587 B2
(45) Date of Patent: Jul. 6, 2010

(54) DATA PRODUCTION METHOD AND APPARATUS

(75) Inventors: Osamu Kawamae, Kawasaki (JP); Eijiro Tazawa, Tokyo (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 879 days.

(21) Appl. No.: 11/634,962

(22) Filed: Dec. 7, 2006

(65) Prior Publication Data

US 2007/0198842 A1 Aug. 23, 2007

(30) Foreign Application Priority Data

Feb. 9, 2006 (JP) ............................. 2006-031815
Sep. 27, 2006 (JP) ............................. 2006-261643

(51) Int. Cl.
 *G06K 9/00* (2006.01)
 *H04L 9/32* (2006.01)
(52) U.S. Cl. ...................... 382/100; 713/176
(58) Field of Classification Search .................. None
  See application file for complete search history.

(56) References Cited

U.S. PATENT DOCUMENTS

2007/0140078 A1 * 6/2007 Muraki et al. ............ 369/47.12
2007/0147207 A1 * 6/2007 Sako et al. ................ 369/53.31
2008/0310673 A1 * 12/2008 Petrovic et al. ............. 382/100

FOREIGN PATENT DOCUMENTS

| JP | 11-144-381 | 5/1999 |
| JP | 2002-158978 | 5/2002 |
| JP | 2003-091925 | 3/2003 |
| JP | 2005-182889 | 7/2005 |

OTHER PUBLICATIONS

Pre-Recorded Video Book, "Advance Access Content System (AACS)", Revision 0.90, p. 13, Fig -3-1, Apr. 14, 2005.

* cited by examiner

*Primary Examiner*—Charles Kim
(74) *Attorney, Agent, or Firm*—Antonelli, Terry, Stout & Kraus, LLP.

(57) ABSTRACT

A watermark information detection process prevents prolonging of time required for setup process when no watermark information can be detected from an optical disc where watermark information has been recorded. During a setup, the number of retrials is limited. Weighting of the retrial is changed so that detection of watermark information is performed when it is confirmed that watermark information is recorded. This enables detection of information for copyright protection in an appropriate processing time.

6 Claims, 6 Drawing Sheets

DATA PRODUCTION METHOD AND APPARATUS

INCORPORATION BY REFERENCE

The present application claims priorities from Japanese applications JP2006-031815 filed on Feb. 9, 2006, JP2006-261643 filed on Sep. 27, 2006, the contents of which are hereby incorporated by reference into this application.

BACKGROUND OF THE INVENTION

The present invention relates to a data reproduction method and a data reproduction apparatus.

Widely used DVD may be a reproduction-dedicated medium DVD-ROM or recording type DVD (DVD-R, DVD-RAM, DVD-RW, etc.) A DVD-ROM containing a content such a movie is manufactured using the copyright protection technique CSS (Content Scramble System) for limiting copying.

As a copyright protection technique other than the CSS, there are CPPM (Content Protection for Prerecorded media) and CPRM (Content Protection for Recordable Media). Thus, an optical disc such as DVD employs a copyright protection technique in accordance with the recording medium.

Moreover, JP-A-2005-182889 discloses a copyright protection technique for an information recording medium. JP-A-2005-182889 introduced a method using a physical index for performing content reproduction.

Furthermore JP-A-2002-158978 discloses an electronic watermark embedding method and a detection method for changing the embedding intensity.

SUMMARY OF THE INVENTION

The technique disclosed in JP-A-2005-182889 shows a physical index in the ROM disc. However, JP-A-2005-182889 does not disclose a retry processing to be performed when read of the physical index has failed. FIG. 4 of JP-A-2005-182889 shows a recording of a physical index, wherein pattern A or pattern B detection level differs depending on the degree how much the pit on the disc is deviated from the center line. When the deviation from the center line is large, pattern A or pattern B can easily be detected. However, when the deviation from the center is small, it is difficult to detect the pattern A or the pattern B. For this, it is necessary to consider how to correctly detect the retry processing when detection has failed.

It is therefore an object of the present invention to provide a data reproduction method and a data reproduction apparatus capable of reducing the setup time when data is read from a recording medium and reproduced.

In order to achieve the aforementioned object, according to an aspect of the present invention, a data reproduction method for reading out information from a recording medium and reproducing the information comprises steps of: identifying a type of a recording medium inserted; reading out watermark information from the recording medium; and outputting the information associated with the watermark information read out from the recording medium, wherein if no watermark information is detected from the recording medium, the watermark information read-out processing method is switched depending on whether the detection of watermark information is performed during a setup process or after the setup process.

In order to achieve the aforementioned object, according to another aspect of the present invention, a data reproduction apparatus for reading out information from a recording medium and reproducing the information comprises: a rotation control circuit for controlling rotation of a recording medium; an optical pickup for reading out data from the recording medium; a servo control circuit for performing focusing, tracking, and access control of the optical pickup; a reproduction signal processing circuit for reproducing the signal read out by the optical pickup; and a detection circuit for detecting watermark information from the signal read out from the optical pickup, wherein watermark information is recorded in the recording medium, the watermark information recorded is detected by the detection circuit, and if the watermark information recorded in the recording medium cannot be detected, the watermark information read-out method is switched depending on whether the detection of the watermark information is performed during a setup process or after the setup process.

This invention enables detection of information for copyright protection in an appropriate processing time and user-friendly data reproduction.

Other objects, features and advantages of the invention will become apparent from the following description of the embodiments of the invention taken in conjunction with the accompanying drawings.

DESCRIPTION OF THE EMBODIMENT

Description will now be directed to watermark information for copyright protection recorded in a recording medium according to the present invention. Here, explanation will be given on a DVD-ROM disc where a content is recorded in advance and the recording data is recorded by forming a pit on the disc. Here, this is called a ROM disc.

Figure 4:
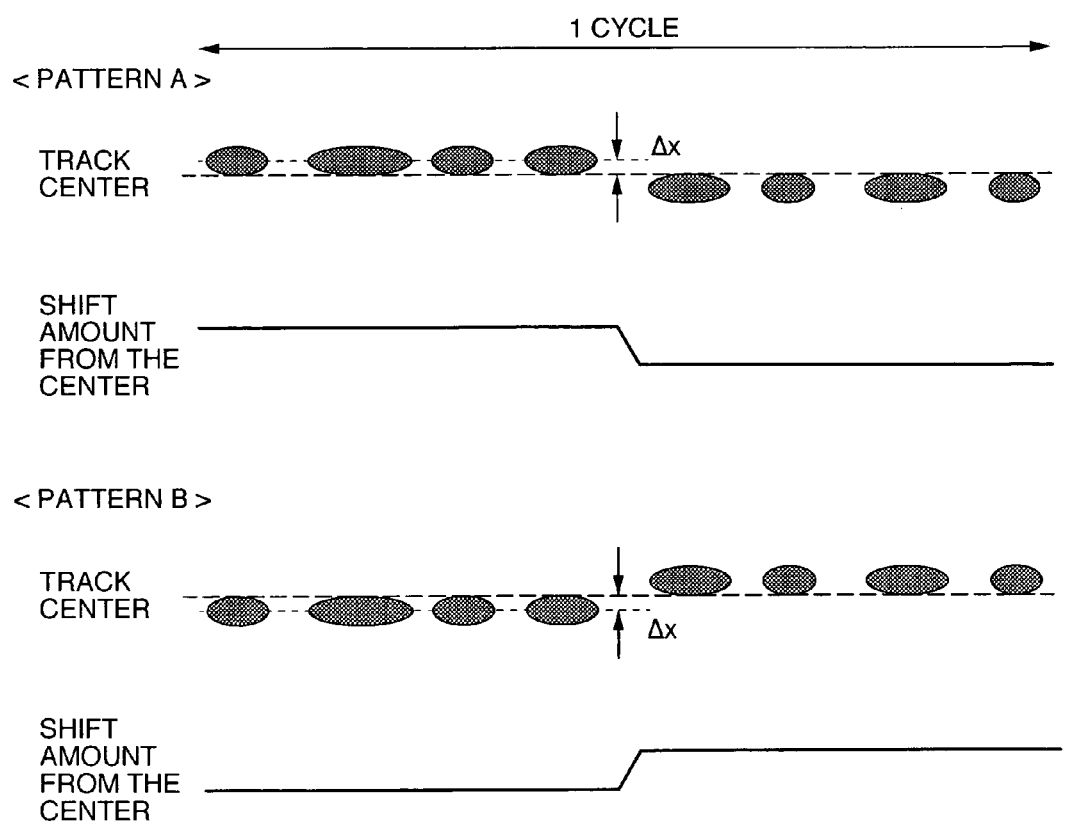
FIG. 4 shows an example of a watermark information embedding method.

Referring to FIG. 4, explanation will be given on the physical index disclosed in JP-A-2005-182889, which shows an example of a recording method of a signal indicating pattern A or pattern by deviation from the central line. In this invention, this is called as watermark information. In this watermark information, the pattern A or the pattern B detection level are different depending on the degree how much is the deviation $\Delta x$ from the central line. When the deviation $\Delta x$ from the center is large, it is easy to detect to the pattern A or the pattern B. However, when the deviation $\Delta x$ from the center is small, the judgment threshold value is small and it is difficult to detect the pattern A or the pattern B.

When the watermark information is to be used for copyright management, i.e., the content whose copyright is protected is encrypted and recorded on a recording medium and the content is decrypted upon reproduction by using the watermark information as the key information, it is necessary to read the watermark information for reproducing the content. For example, on a ROM disc containing movie software, it is impossible to normally reproduce the content only by reading out the recorded data and a decryption key is required for decrypting the scramble performed on the content. The key is read out from the ROM disc and the scramble performed on the content is decrypted by the key so as to enable normal reproduction.

Figure 1:
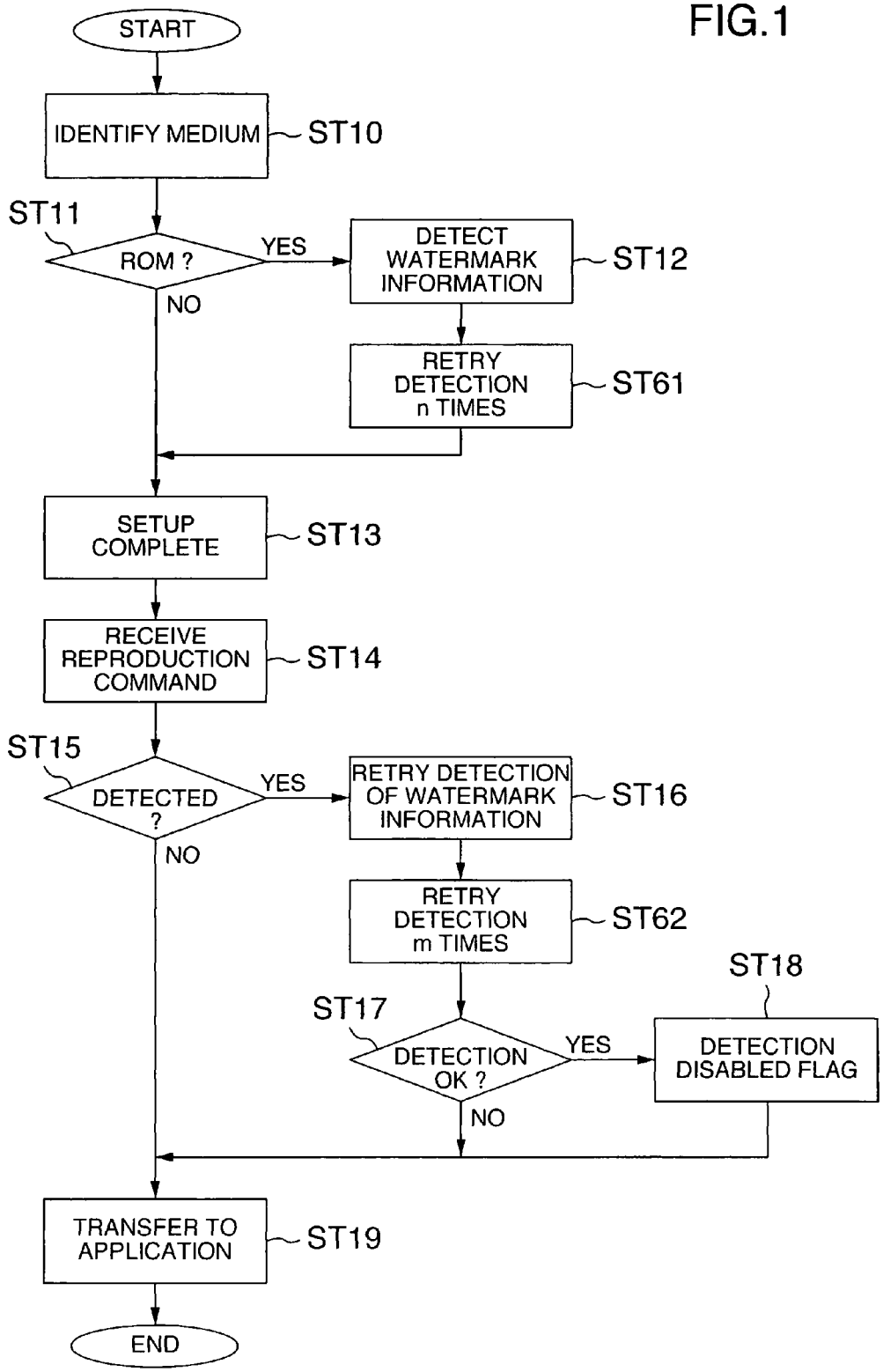
FIG. 1 shows an example of a processing method of a watermark information detection according to the present invention.

As has been described above, when the watermark information is recorded to indicate the pattern A or the pattern B depending on the deviation from the center of the pit, if the deviation $\Delta x$ is small, there is a case that the watermark information cannot be detected. In this case, retry processing is performed for trying re-detection of the watermark information. FIG. 1 is a flowchart of processing for detecting watermark information recorded on the recording medium. When the recording medium is inserted into a reproduction apparatus, firstly, in ST10, judgment of the recording medium is performed. Next, in ST11, it is detected whether the disc is a ROM disc or not. "YES" indicates that the disc is a ROM disc, and "NO" indicates that it is not. Explanation will be given, assuming that the ROM disc contains scrambled data for copyright protection. Moreover, when the medium is identified, normally adjustment processing is performed according to the type of the medium but its explanation is omitted. When the disc is not a ROM disc, the setup processing is temporarily terminated (ST13) for waiting for the next command input. When the disc is a ROM disc, ST12 performs processing for reading the watermark information. In ST12, access is made to the region where the watermark information is recorded and the watermark information is read and detected. If the watermark information is detected, the detected watermark information is temporarily stored and the setup terminates with completion of detection of the water information. The process up to the setup end may be called loading.

Here, in the case of optical disc, normally it is preferable that the setup time be short. When the setup is completed, a user can proceed to a desired process. Accordingly, even if the watermark information cannot be detected at the first detection, retry may not be performed or the minimum retry process is performed before terminating the setup. "n" indicates the number of retries and the minimum number of retry processes is n. When no retry is performed, n=0. Here, when it is unclear whether watermark information is recorded upon detection of watermark information, if retry process is repeated regardless of absence of watermark information, the setup time is prolonged in vain. When a predetermined address is read out for detection of watermark information, necessary data acquisition with the same address and adjustment process can be performed simultaneously, they may be performed in parallel.

Next, after the setup is complete, in ST14, a content reproduction is instructed by a command from the reproduction application. When the reproduction command is received, ST15 firstly checks whether detection of watermark information for decrypting the scramble of the content is complete. If the detection is complete, in ST19, key information detected from the watermark information is transferred. Here, if the watermark information is a decryption key for decrypting the content, instead of directly transferring the key, it is possible to subject the key to encryption so that the key is not read in the way before being transmitted to the application side. When detection of the watermark information in ST15 is not complete in the setup process, ST16 retries detection of the watermark information. Here, a request from the application is presence, it is sure that the watermark information is recorded. Accordingly, if detection in the read process of the watermark information is not successful at the first time, several retrials are repeated to detect the watermark information. When the watermark information is detected in ST17 by re-detection, a decryption key is transferred to the application. If the watermark information cannot be read by the retrial in ST17, it is decided that read is impossible and an error flag indicating that detection is impossible is returned to the application in ST18.

Thus, by changing the number of retrial processes through the detection of the watermark information during the setup process and read-out after the setup, it is possible to prevent increase of the setup time and perform an appropriate detection operation. For example, if during the setup, n=0 is set, i.e., no retrial is performed and if after the setup, $m \geq 1$ is set, i.e., retrial is allowed. Alternatively, if during the setup, ST61 performs n retrials and if after the setup, ST62 performs m retrials (n<m). Thus, by performing control while changing the weight of the retrials between during the setup and after the setup, it is possible to shorten the setup process and performs an appropriate detection operation after the setup.

Moreover, as compared to the detection of the watermark information during the setup process, it is possible to lower a detection threshold value of the watermark information during the read-out after the setup so that the probability of the detection of the watermark information is increased although the detection accuracy is lowered. Moreover, if the watermark information detection accuracy can be increased by repeating the detection trials, repetition is performed by a retrial and the number of retrials is increased. Moreover, it is also considered that the read performance is lowered because of a scar or a defect of the recording medium. If the watermark information is recorded in a plurality of places, the plurality of places can be accessed during retrial after the setup so as to increase the detection probability.

Furthermore, in order to detect the watermark information, it is possible to add a process for modifying the parameter of the reproduction signal detection in the retrial process. By modifying adjustment of the signal amplitude or characteristic of the waveform equalization circuit, characteristic of the band pass filter, or the servo characteristic, it may be possible to increase the probability of the watermark information detection.

Figure 6:
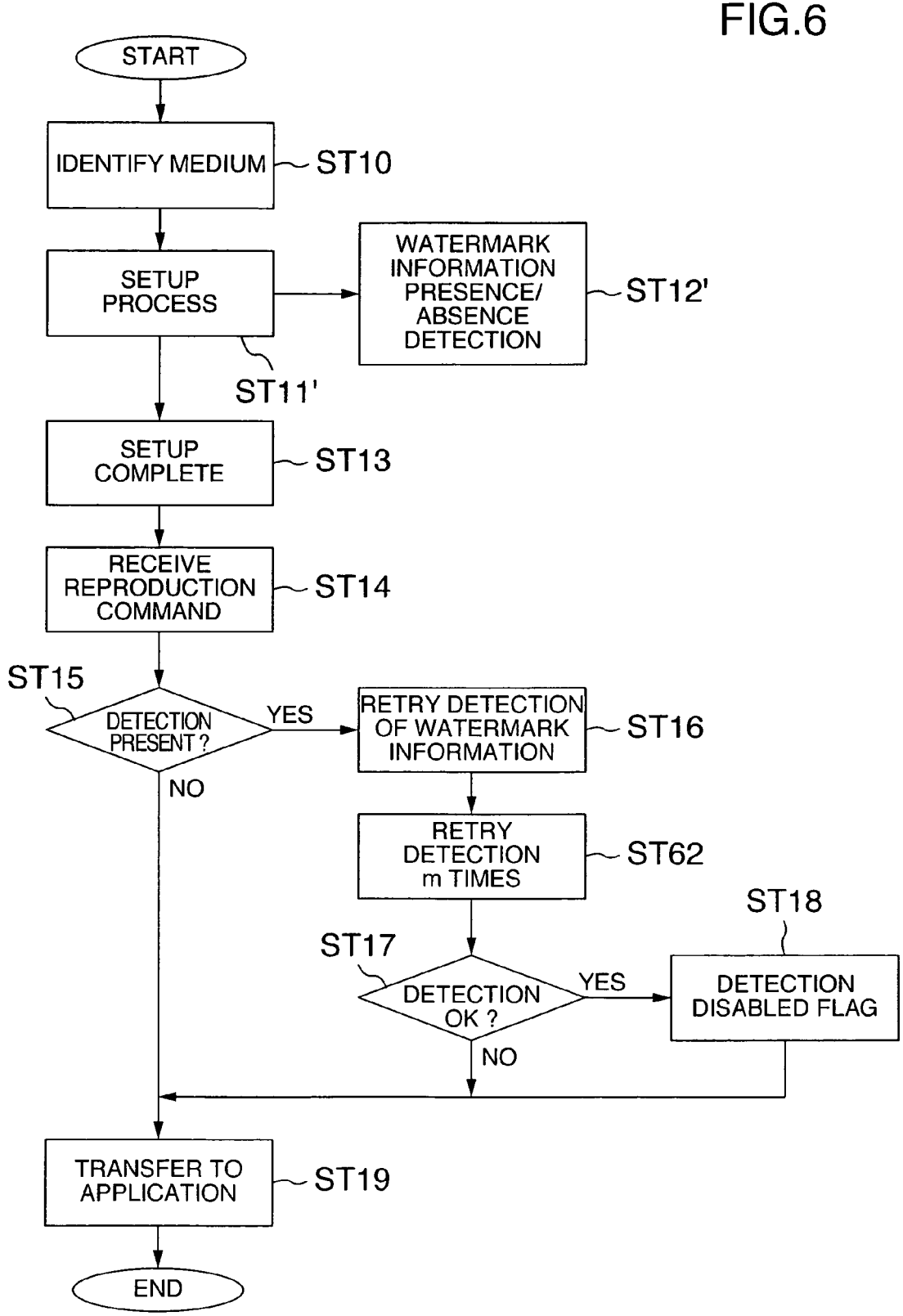
FIG. 6 shows another example of a watermark information detection method according to the present invention.

FIG. 6 shows an embodiment in which watermark information detection is not performed during a setup process. ST11' is a setup process which is normally performed. During this process, various adjustments and learning process are performed and read out of information on the disc is also performed. ST12' detects presence/absence of watermark information in the information on the disc from which read has been performed in ST11' and accumulates the detection result. After the setup process is complete, according to the presence/absence of the watermark information, the watermark information detection is performed. By using such a processing procedure, it is possible to reduce the time required for the setup. Moreover, when watermark information cannot be detected at the first time and a retrial is performed, the retrial can be performed by assuming that the watermark information exists and the retrial can be repeated until the watermark is successfully detected. The read-out of the watermark information after the setup may be performed after completion of the setup or in response to a reproduction command from the application side.

Figure 2:
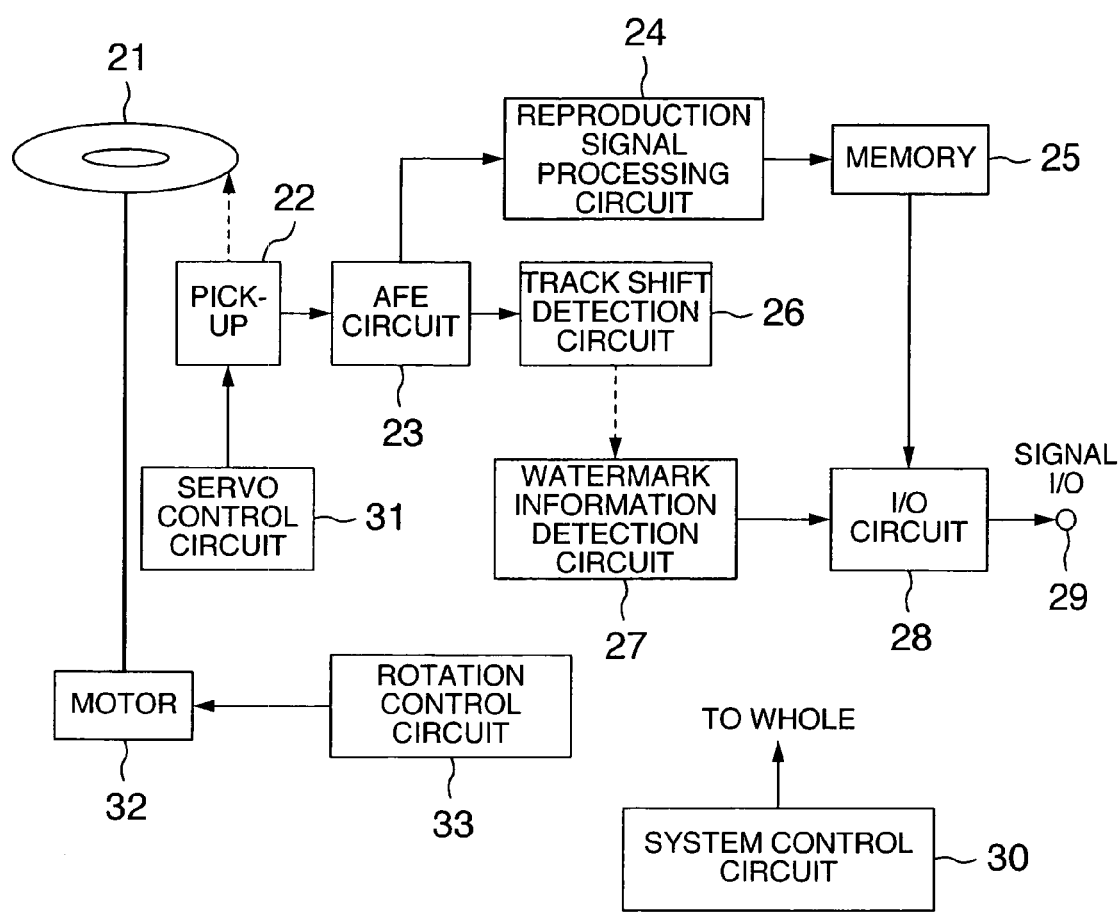
FIG. 2 shows an example of configuration of a reproduction apparatus used for the watermark information detection according to the present invention.

Next, explanation will be given on the data reproduction apparatus for detecting the watermark information. FIG. 2 shows an example of configuration of the optical disc reproduction apparatus. A reference symbol 21 denotes a recording medium, which is a ROM disc here. A content recorded on the ROM disc 21 is reproduced by using a pickup 22. A signal from the pickup 22 is subjected to amplification and waveform equalization by an AFE circuit and calculation is performed to generate a main signal for reproducing the content and a servo signal for pickup focus and tracking. The main signal is sent to a reproduction signal processing circuit 24 and subjected to signal processing such as demodulation, error correction, and de-interleave. Here, the processing is performed while accumulating the data in a memory 25. A track shift detection circuit 26 detects a track shift amount and the watermark information is read by a watermark information detection circuit 27. This can be detected, for example, by the tracking error signal. A pickup servo control circuit 31 performs not only the aforementioned focus and tracking control but also control of the access process up to the read position. A rotation control circuit 33 controls a motor 32 so as to rotate the disc at a desired rpm. A system control circuit 30 controls the entire operation. As shown in FIG. 1, the system control circuit 30 controls the medium judgment process start, the setup end, instruction of access to a desired data region, and retrial. For example, when the judgement process identifies a ROM disc, access is made to the region containing the watermark information and detection of the watermark information is performed. Moreover, in the retrial process, the pickup is moved to access a predetermined region and detection operation is performed.

Figure 3:
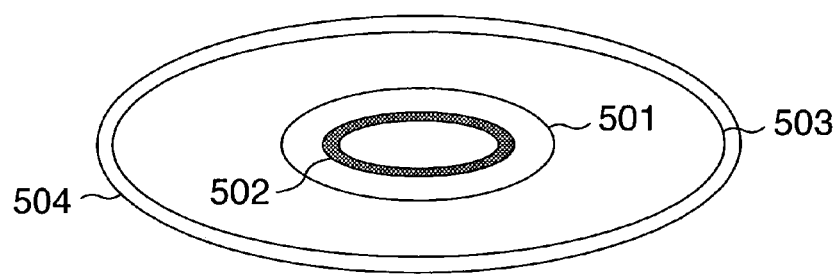
FIG. 3 shows a configuration example of a region of an optical disc where information is recorded.

FIG. 3 shows a configuration example of an optical disc recording region. In the optical disc, normally, disc management information called lead-in 501 is recorded in the innermost circumference. A lead-out region 504 is recorded in the outer circumference. Between the lead-in and the lead-out regions, a user data region 503 is present, where main data is recorded.

When a disc is inserted, firstly, the disc type is identified. After adjustment is complete, management information is read out. If watermark information is recorded in the region, control is performed to read out the watermark information simultaneously with the read of the data from the management region, so as to reduce the time until the setup end. Depending on the disc type, there is a region containing information on the disc called BCA (Burst Cutting AREA) 502 in the inner circumference.

Next, explanation will be given on a method to judge whether watermark information is recorded on a ROM disc. Since an owner of a content decides whether the content requires a copyright protection, the content may not be encrypted by scramble. In such a case, there is no need of read out watermark information. Thus, according to the content type, there are cases when watermark information is recorded and when no watermark is recorded. For this, when no watermark information is recorded, detection of watermark is an unnecessary process and an incorrect operation may be caused by an erroneous detection. Accordingly, it is advantageous to judge whether the disc contains watermark information. By recording a flag for judging whether the disc contains watermark information in a region where information to be reproduced when a ROM disc is identified in the process up to the aforementioned setup, it is possible not to perform an unnecessary detection process and perform an appropriate retrial process.

Figure 5:
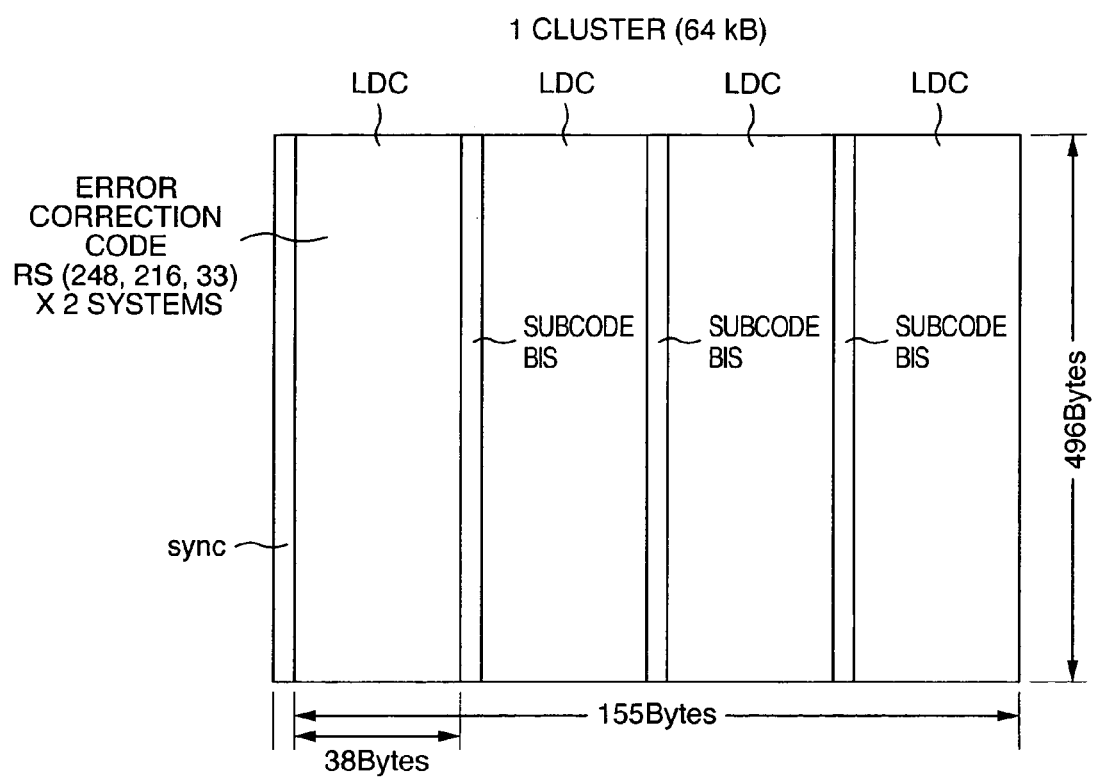
FIG. 5 shows recording cluster configuration of a Blu-ray disc.

FIG. 5 shows a data configuration of a Blu-ray disc. In the Blu-ray disc, the minimum recording unit 64-K byte data called a cluster. A cluster is formed by an LDC (Long Distance Code), a BIS (Burst Indicator Subcode), and a synchronization signal. An error inspection code and an error correction code are added to main data recorded. The LDC has such a configuration that 32 error correction codes are added for 216 data sets. This can be expressed by the Reed Solomon Code format RS (248, 216, 33). The LDC is 496 bytes×38 bytes×4. On the other hand, data such as address information is recorded as the BIS. The BIS is 496 bytes×1 byte×3. By recording a flag indicating whether watermark information is recorded in the BIS, for example, in this region, it is possible to easily decide whether watermark information is recorded. Moreover, when recording presence/absence of the watermark information in the BIS, it is possible to record an encrypted flag so that it is not altered or a flag requiring authentication instead of recording a flag simply indicating presence/absence of watermark information.

Moreover, by recording information indicating whether watermark information is recorded, in the BCA region, it is possible to decide presence/absence of the watermark information during the setup without accessing the user data region for read since the data in the BCA region is read out during the setup process. Moreover, by detecting watermark information after confirming presence/absence of watermark information, there is no need of performing unnecessary retrial when no watermark information is present. On the contrary, if watermark information is present, retrials are performed to surely detect the watermark information. This improves the detection accuracy.

Moreover, it is possible to judge whether a video content such as a movie has a copyright protection by judging whether data is scrambled. For example, if the image data has been compressed by MPEG-2 method, header information containing address information called a packet header is described at a particular cycle. It is possible to judge whether the data is scrambled by judging whether the header information can be detected periodically.

Next, explanation will be given on a case when watermark information is embedded regardless of the presence/absence of the content copyright. For example, when it is assumed that a ROM disc always contains watermark information, if the medium judgment identifies a ROM, a detection process of watermark information is performed without fail. In such a case, since it is known that watermark information is recorded, watermark information is detected by retrials even during the setup. Moreover, when the content need not have a copyright protection, a predetermined particular code such as "00" and "FF" is assigned to the watermark information itself, and it can be known that the detected watermark information has no copyright protection.

Thus, by performing a detection process of watermark information, it is possible to reduce the setup process time. Moreover, when it is judged that watermark information is recorded, detection of watermark information is performed without fail, thereby improving the detection ratio.

Moreover, detection of information for copyright protection can be performed in an appropriate processing time.

Figure 7:
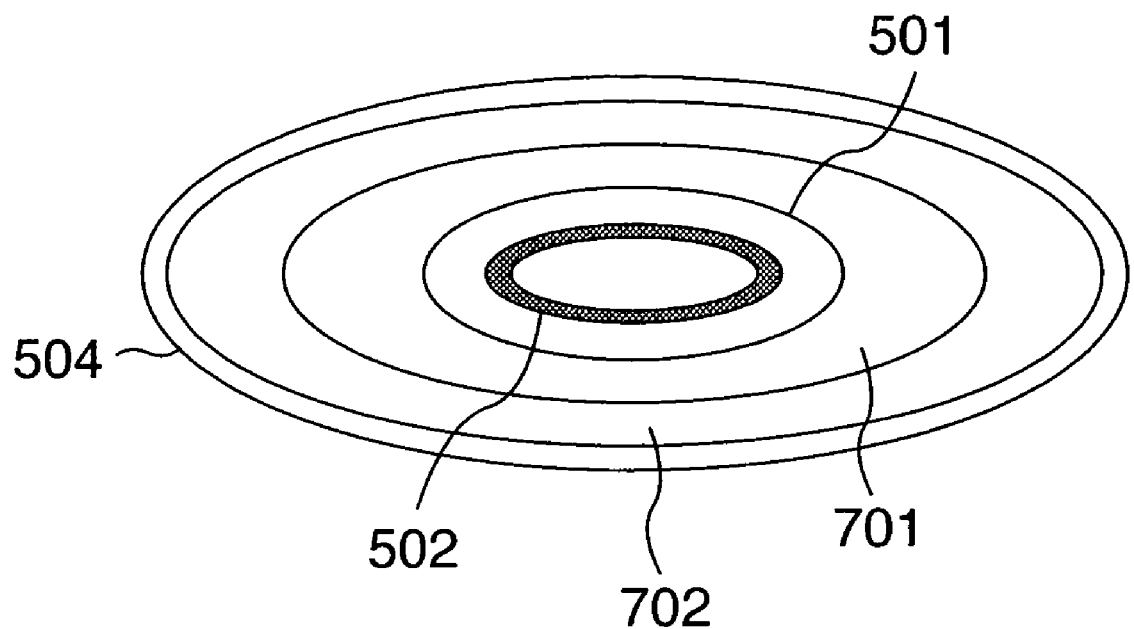
FIG. 7 shows another configuration example of the region containing information recorded on the optical disc.

FIG. 7 shows another example of configuration of the user data region shown in FIG. 3. The user data region 503, for example, contains data whose copyright is protected and data whose copyright is not protected. Numeral 701 denotes data whose copyright is not protected, and numeral 702 denotes data whose copyright is protected. Here, these regions are divided into the inner circumferential region and the outer circumferential region. However, each of the regions may be divided into a plurality of regions or may be mixed with each other. In a case when such data is recorded, for example, the data whose copyright is protected is a movie while the data whose copyright is not protected may be disc menu information and movie advertisement information as an auxiliary content. Moreover, there is a case where a movie content whose copyright is not protected and game software whose copyright is protected are contained together. In such a case, when reading out only the data whose copyright is not protected, there is no need of reading out the watermark information. For this, as shown in FIG. 6, no watermark information detection may be performed in the setup process and the watermark information detection is performed only when read out is performed from the application.

Here, by providing management information indicating whether the content on the disc contains data whose copyright is not protected and where on the disc the data whose copyright is not protected is recorded, it is possible to easily reproduce the data whose copyright is not protected. Moreover, when reproducing the address containing data whose copyright is protected, by detecting the watermark information, it is possible to reproduce the data whose copyright is protected. It is also possible to arrange, on a disc, management information indicating where on the disc the data whose copyright is protected is recorded.

Moreover, by recording a flag indicating whether the disc contains only data whose copyright is protected, or the disc contains only data whose copyright is not protected, or the disc contains both data whose copyright is protected and not protected, in the lead-in area 501 and the BCA area 502 shown in FIG. 3, it is possible to perform an appropriate setup in accordance with the content recorded on the disc.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A data reproduction method for reading out information from a recording medium and reproducing the information, the method comprising steps of:
    identifying a type of a recording medium inserted;
    reading out watermark information from the recording medium; and
    outputting the information associated with the watermark information read out from the recording medium;
    wherein if no watermark information is detected from the recording medium, the watermark information read-out processing method is switched depending on whether the detection of watermark information is performed during a setup process or after the setup process;
    wherein if the detection is performed during the setup process, the number of retrials of read-out of watermark information is limited to n times, and if the detection is performed after the setup process, control is switched to limit the number of retrials to m times (n<m).

2. The data reproduction method as claimed in claim 1, wherein if the detection is performed during the setup process, control is performed not to perform a retrial of read-out of watermark information, and
    if the detection is performed after the setup process, control is switched to perform the retrial.

3. The data reproduction method as claimed in claim 1, wherein the retrial is performed by modifying a parameter used for detection of a data reproduction signal in the retrial after the setup process.

4. A data reproduction apparatus for reading out information from a recording medium and reproducing the information, the apparatus comprising:
    a rotation control circuit for controlling rotation of a recording medium;
    an optical pickup for reading out data from the recording medium;
    a servo control circuit for performing focusing, tracking, and access control of the optical pickup;
    a reproduction signal processing circuit for reproducing the signal read out by the optical pickup; and
    a detection circuit for detecting watermark information from the signal read out from the optical pickup;
    wherein watermark information is recorded in the recording medium,
    the watermark information recorded is detected by the detection circuit, and
    if the watermark information recorded in the recording medium cannot be detected, the watermark information read-out method is switched depending on whether the detection of the watermark information is performed during a setup process or after the setup process;
    wherein if the detection is performed during the setup process, the number of retrials of read-out of watermark information is limited to n times, and if the detection is performed after the setup process, control is switched to limit the number of retrials to m times (n<m).

5. The data reproduction apparatus as claimed in claim 4, wherein if the detection is performed during the setup process, control is performed not to perform a retrial of read-out of watermark information, and
    if the detection is performed after the setup process, control is switched to perform the retrial.

6. The data reproduction apparatus as claimed in claim 4, wherein the retrial is performed by modifying a parameter used for detection of a data reproduction signal in the retrial after the setup process.

* * * * *